United States Patent
Moffitt et al.

(10) Patent No.: US 11,072,690 B2
(45) Date of Patent: Jul. 27, 2021

(54) FURANOATE-BASED POLYESTER AND COPOLYESTER COMPOSITIONS USING FALLING STRAND DEVOLATILIZATION

(71) Applicant: THE COCA-COLA COMPANY, Atlanta, GA (US)

(72) Inventors: Ronald D. Moffitt, Spartanburg, SC (US); Jasmeet Kaur, Atlanta, GA (US)

(73) Assignee: THE COCA-COLA COMPANY, Atlanta, GA (US)

( * ) Notice: Subject to any disclaimer, the term of this patent is extended or adjusted under 35 U.S.C. 154(b) by 494 days.

(21) Appl. No.: 15/780,906

(22) PCT Filed: Dec. 2, 2016

(86) PCT No.: PCT/US2016/064675
§ 371 (c)(1),
(2) Date: Jun. 1, 2018

(87) PCT Pub. No.: WO2017/096200
PCT Pub. Date: Jun. 8, 2017

(65) Prior Publication Data
US 2018/0346662 A1   Dec. 6, 2018

Related U.S. Application Data

(63) Continuation of application No. PCT/US2016/064675, filed on Dec. 2, 2016.

(60) Provisional application No. 62/262,639, filed on Dec. 3, 2015.

(51) Int. Cl.
| | | |
|---|---|---|
| *C08J 3/20* | (2006.01) | |
| *B29B 11/10* | (2006.01) | |
| *B29B 11/14* | (2006.01) | |
| *C08G 63/78* | (2006.01) | |
| *B29B 13/06* | (2006.01) | |
| *C08J 3/12* | (2006.01) | |
| *C08G 63/90* | (2006.01) | |
| *C08G 63/181* | (2006.01) | |
| *B29B 13/00* | (2006.01) | |
| *B29C 48/14* | (2019.01) | |
| *B29C 48/285* | (2019.01) | |

(52) U.S. Cl.
CPC ............. *C08J 3/201* (2013.01); *B29B 11/10* (2013.01); *B29B 11/14* (2013.01); *B29B 13/06* (2013.01); *C08G 63/181* (2013.01); *C08G 63/785* (2013.01); *C08G 63/90* (2013.01); *C08J 3/12* (2013.01); *B29B 13/00* (2013.01); *B29B 2013/005* (2013.01); *B29C 48/143* (2019.02); *B29C 48/287* (2019.02); *B29C 2791/006* (2013.01); *C08J 2367/00* (2013.01); *C08J 2367/02* (2013.01)

(58) Field of Classification Search
USPC ............ 528/501; 526/71; 159/2.1, 2.3, 28.6, 159/43.1
See application file for complete search history.

(56) References Cited

U.S. PATENT DOCUMENTS

| | | | | |
|---|---|---|---|---|
| 3,928,300 | A * | 12/1975 | Hagberg | ............. B01D 3/06 528/501 |
| 4,294,652 | A * | 10/1981 | Newman | ............. B01D 3/06 159/2.1 |
| 5,372,765 | A | 12/1994 | Chen et al. | |
| 9,777,111 | B2 * | 10/2017 | Colhoun | ............. C08L 67/02 |
| 2001/0056176 | A1 | 12/2001 | Takami et al. | |
| 2007/0164462 | A1 * | 7/2007 | Liu | ............. C08F 6/003 261/112.1 |
| 2009/0093600 | A1 | 4/2009 | Moore et al. | |
| 2014/0000801 | A1 | 1/2014 | Seo et al. | |

OTHER PUBLICATIONS

International Search Report and Written Opinion for PCT/US2016/064675 dated Mar. 15, 2017.

* cited by examiner

*Primary Examiner* — Terressa Boykin
(74) *Attorney, Agent, or Firm* — Eversheds Sutherland (US) LLP

(57) ABSTRACT

Polymers and copolymers, and systems and methods for processing the same. Advantageously, the polymers and copolymers of the present invention have undergone processing in a falling strand devolatilizer and rotary disk finisher such that a low-cost, low-energy, and high-production-rate product is produced.

19 Claims, 6 Drawing Sheets

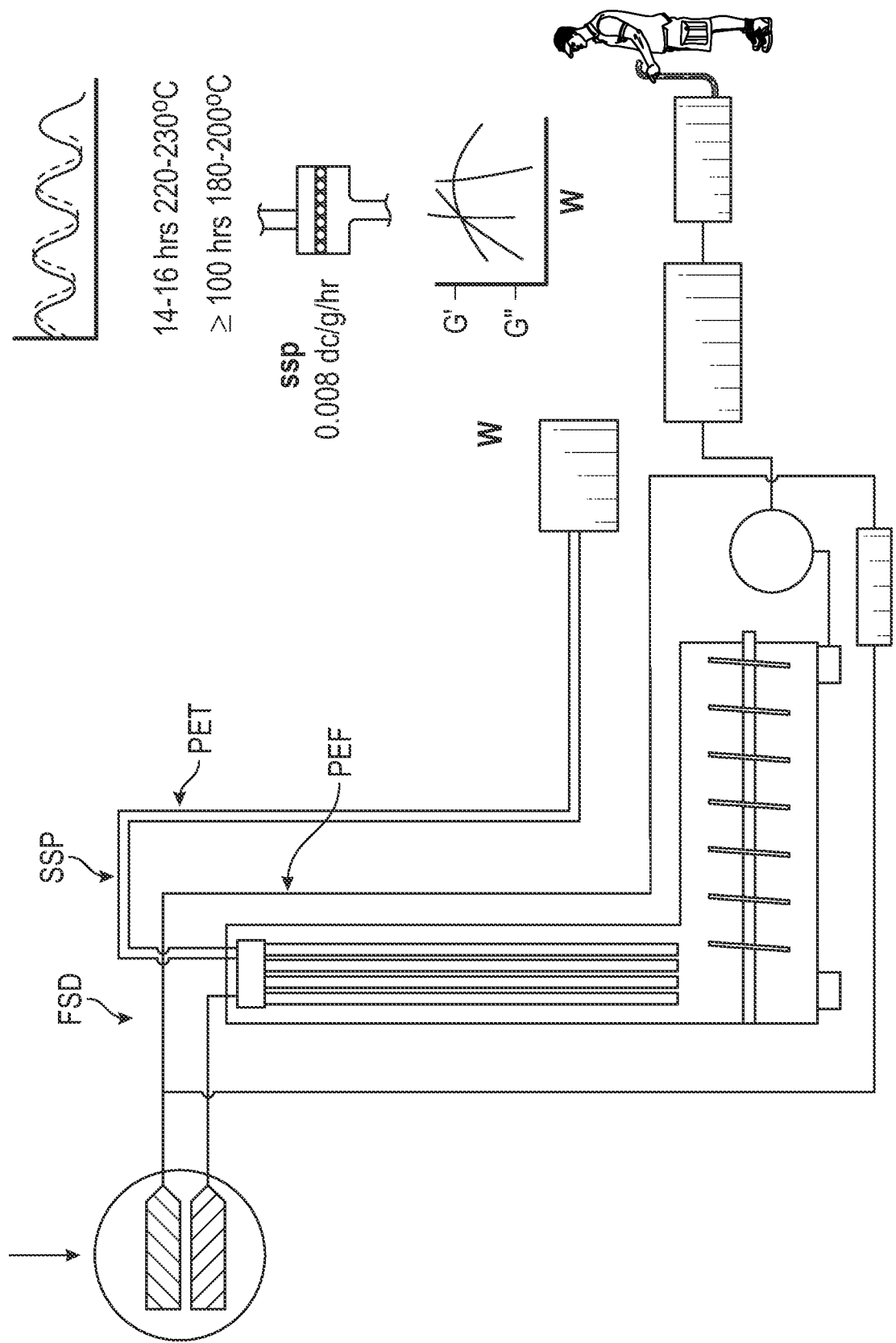

US 11,072,690 B2

FURANOATE-BASED POLYESTER AND COPOLYESTER COMPOSITIONS USING FALLING STRAND DEVOLATILIZATION

CROSS REFERENCE TO RELATED APPLICATIONS

This application is a 35 U.S.C. § 371 National stage application of International Patent Application No. PCT/US2016/064675, filed 2 Dec. 2016, which claims priority to U.S. Provisional Patent Application No. 62/262,639, filed 3 Dec. 2015, both of which are incorporated by reference herein in their entireties.

FIELD OF THE ART

The present invention is directed to polymers and copolymers, and systems and methods for processing the same. Advantageously, the polymers and copolymers of the present invention have undergone processing in a falling strand devolatilizer and rotary disk finisher such that a low-cost, low-energy, and high-production-rate product is produced.

BACKGROUND

Polyesters are used in the production of plastic containers, certain properties of polyesters such as PEF (polyethylene furanoate) and polyethylene terephthalate (PET) differ-impacting processing and performance as compared to other polymers. For example, solid state polymerization (SSP) processing is one particular process that can be implemented.

Melt-state polymerization (MSP) is another process that can be used for making useful polymers for producing plastic containers for instance. With MSP, polyesters and copolyesters offer distinct productivity advantages over SSP processing. Intrinsic viscosity (IV) lift rates in the melt can exceed 0.01 dL/g/min, provided melt surface area renewal can proceed at a high rate in a suitable temperature range (245° C.-275° C.), under vacuum (0.05 mbar-5 mbar), for reaction times ranging from about 0.1 hour to 2 hours. However, in large-scale polycondensation polymerization processes, residence times can be longer, giving rise to increases in resin color due to thermal degradation. The maintenance of a high melt surface renewal rate is imperative to minimizing melt residence times in the reactor so that low-color, high molecular weight polymer can be produced.

Industrial continuous polycondensation processes for polyesters and polyamides have traditionally used high vacuum, rotary disk-type or cage-type horizontal reactors as described in U.S. Pat. Nos. 3,046,099; 3,057,702; 3,248,180; and 5,559,507. While effective at building resin molecular weight, the reactors disclosed in these documents are large; melt residence times are commensurately increased, and melt surface renewal rates are design-limited by the geometry of the various rotary disks, rotary disk spacings, and perforation patterns employed.

Alternatively, falling strand devolatilizers operate with very high melt surface renewal rates since the melt is essentially "spun" as fibers into an evacuated vessel. The thin filaments are drawn down by gravity in a strong flow whereby the filaments are thinned exponentially, resulting in a very high melt surface renewal rate. The exponentially thinning filaments significantly increase the rate of surface area renewal in the evacuated atmosphere of the vessel leading to about 100 times or more increase in the melt volatilization rate. When coupled with a rotary disk finisher, high melt polymerization (intrinsic viscosity build) rates may be achieved. High rates of surface area renewal are specified by the extrusion rate, the number of filaments in the die head, and the length of the free fall to the melt pool from the die face. Falling strand devolatilizers are described in U.S. Pat. Nos. 3,853,672; 3,966,538; 4,294,652; 5,069,750; 5,136,017; 5,380,322; and 7,268,206; in European Patent Serial Nos. 0369708; and 0499747; and in U.S. Patent Application Publication No. 2008/0255338.

There remains a need for substantially bio-based polymers with properties optimized for their packaging applications. Falling strand devolatilization preceeding, succeeding, or both preceeding and succeeding a rotary rotary disk finisher, may be used effectively to produce bio-based polymers having lower color (e.g. yellowness) and high molecular weight.

BRIEF SUMMARY

The present invention is directed to polymers and copolymers, and systems and methods for processing the same. Advantageously, the polymers and copolymers of the present invention have undergone processing in a falling strand devolatilizer such that a low-cost, low-energy, and high-production-rate product is produced.

According to at least one implementation of the present invention, a polymer or copolymer is processed through a falling strand devolatilizer thereby lifting the intrinsic viscosity (IV) of the copolymer.

According to at least one implementation of the present invention, a process for melt-state polymerization of polyesters and co-polyesters includes a) compounding an inorganic and/or organic additives with recycled, non-recycled and/or virgin polyester pellets made from polymers such as poly(ethylene-2,5-furandicarboxylate) (PEF); poly(trimethylene-2,5-furandicarboxylate) (PTF); poly(butylene-2,5-furandicarboxylate) (PBF); poly(isosorbide-2,5-furandicarboxylate) (PISF); poly(isoidide-2,5-furandicarboxylate) (PIIF); poly(isomannide-2,5-furandicarboxylate) (PIMF); poly(neopentyl-2,5-furandicarboxylate) (PNPGF); poly(ethylene-2,5-furandicarboxylate) with 10 mol. % 1,8-naphthalene dicarboxylate (PEF-PEN), poly(1,4-phenylene-2,5-furandicarboxylate) (PCHF); poly(1,2-dimethylphenylene-2,5-furandicarboxylate) (PDMFF); and any combinations thereof, mixtures/blends thereof, or copolymers thereof to form a resin; b) adding said resin into a falling strand devolatilizer thereby lifting the intrinsic viscosity (IV) of the resin; and c) pelletizing said resin.

In the process, the polyester pellets are compounded at about 0.50 to about 0.95 dL/g.

In the process, the lifted IV exceeds that of a convention SSP process by 25% or more for polyesters and co-polyesters.

According to at least one implementation of the present invention, a process for melt-state polymerization of polyesters and co-polyesters includes a) plasticating and melting polyester pellets or polyester pellets and extruding them into a falling strand devolatilizer to form a resin with lifted intrinsic viscosity (IV); feeding said resin melt with developed IV into a compounder; and pelletizing said resin.

In the process, the feed polyester pellets are compounded within a range of about 0.50 to about 0.95 dL/g.

In the process, IV lift rate exceeds that of a convention SSP process by 25% or more for polyesters and co-polyesters.

According to at least one implementation of the present invention, a process for melt-state polymerization of polyesters and co-polyesters includes a) compounding an inorganic and/or organic additives with polyester pellets to form a resin; b) adding said resin into an evacuated chamber which may be a falling strand devolatilizer, a rotary disk finisher, or both, thereby lifting the intrinsic viscosity (IV) of the resin; and c) pelletizing said resin.

In the process, the polyester pellets are compounded within a range of about 0.50 to about 0.90 dL/g.

In the process, the lifted IV exceeds that of a convention SSP process by 25 percent or more for polyester or furanoate-based polyesters and co-polyesters.

According to at least one implementation of the present invention, a process for melt-state polymerization of furanoate-based polyesters and co-polyesters includes a) plasticating, melting, and extruding polyester pellets into an evacuated chamber to form a resin with lifted intrinsic viscosity (IV); feeding the IV of said resin into a twin screw compounder; and pelletizing said resin.

In the process, the polyester pellets are compounded within a range of about 0.50 to about 0.95 dL/g.

In the process, the lifted IV exceeds that of a convention SSP process by 25 percent or more for polyesters and co-polyesters.

According to at least one implementation of the present invention, a process for melt-state polymerization of furanoate-based polyesters and co-polyesters includes a) melting polyester pellets to form a resin; b) flowing said resin vertically downward to increase surface area thereby devolatilizing the resin and providing it to a devolitizer/finisher thereby lifting the intrinsic viscosity (IV) of the resin; and c) pelletizing the devolatlized resin.

According to at least one implementation of the present invention, a process for melt-state polymerization of polyesters or furanoate-based polyesters and co-polyesters includes a) melting polyester pellets to form a resin; b) flowing said resin vertically downward in thin filaments or film(s) to increase surface area thereby devolatilizing the resin and providing it to a finisher thereby lifting the intrinsic viscosity (IV) of the resin; and c) pelletizing the devolatilized and polymerized resin.

FIGURES

FIG. 6 is a schematic depicting a system for devolatization of PEF, according to one implementation of the technologies described herein.

DETAILED DESCRIPTION

Figure 1:
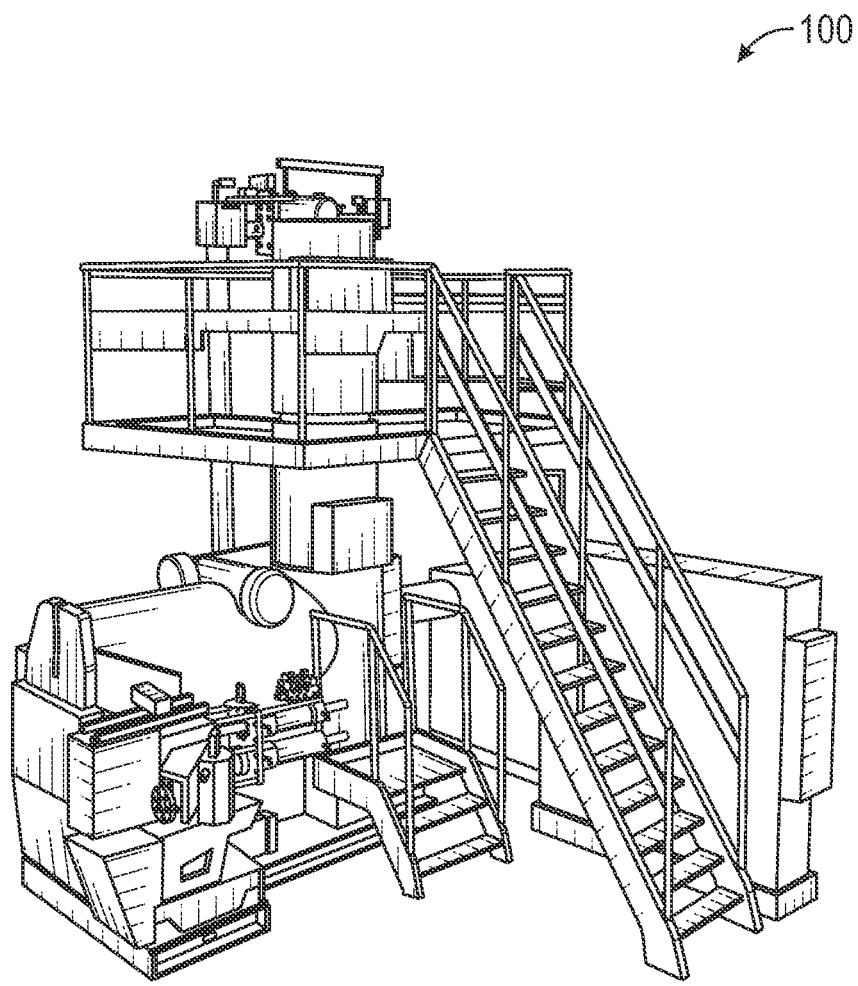
FIG. 1 is a schematic of a falling strand devolatilizer 100 and/or liquid state polycondensation process equipment, according to one implementation of the technologies described herein.

Copolymers useful in the manufacture of plastic articles such as packaging materials (e.g., containers) and that are prepared substantially from bio-based feedstocks are among those described herein. The exemplary copolymers exhibit advantageous physical properties which render them suitable for use in forming molded articles, such as bottles. In particular, the copolymers described here exhibit advantageous physical properties which render them suitable for processing into plastic articles (e.g., preforms, containers), while the articles so formed also exhibit advantageous properties. In certain embodiment, the polyesters or copolyesters have high melt strength relative to unmodified, linear polyesters or copolyesters (e.g. PET, PEF, PTF), making them suitable for use in extrusion blow molding and other processes that require high melt strength.

The copolymers disclosed herein are formed from the reaction of polyesters with at least one chain architecture modifying agents, such as branching agents or chain extenders. The chain architecture modifying agents have a reactive functionality of at least two and preferably, three or four. Process of preparing the copolymers and methods of processing such copolymers are disclosed herein, as well as articles formed therefrom—including preforms and articles, films, and fibers and such packaging articles including but not limited to containers (e.g., bottles). The copolymers disclosed herein may also be formed from reaction of polyesters with other agents. The other agents refer to a compound with functional groups capable of additional reactions with the terminal groups of a polyester resin, e.g., hydroxyl or carboxyl groups. These functional groups reacts with the terminal groups, resulting in chain extension or branching.

Definitions

As used herein, the terms "polymer," "polymers," "polymeric," and similar terms are used in their ordinary sense as understood by one skilled in the art, and thus may be used herein to refer to or describe a large molecule (or group of such molecules) that contains recurring units. Polymers may be formed in various ways, including by polymerizing monomers and/or by chemically modifying one or more recurring units of a precursor polymer. A polymer may be a "homopolymer" comprising substantially identical recurring units formed by, e.g., polymerizing a particular monomer. A polymer may also be a "copolymer" comprising two or more different recurring units formed by, e.g., copolymerizing two or more different monomers, and/or by chemically modifying one or more recurring units of a precursor polymer. The term "terpolymer" may be used herein to refer to polymers containing three or more different recurring units.

Whenever a range is presented herein it should be understood to include each element of the range. For example, the range "$C_1$ to $C_4$" alkyl independently includes $C_1$, $C_2$, $C_3$ and $C_4$ alkyl groups. When such a range is stated, each element has been contemplated and the range is used merely for convenience.

Generally, while the polymers, compositions and processes are described in terms of "comprising" various components or steps, the polymers, compositions and processes can also "consist essentially of" or "consist of" the various components and steps.

The term "alkyl" is used herein, unless otherwise specified, refers to a saturated straight, branched, primary, secondary, or tertiary hydrocarbon, including but not limited to those of $C_1$ to $C_8$. Illustrative examples of alkyl groups are methyl, ethyl, propyl, isopropyl, butyl, secbutyl, isobutyl, tertbutyl, 1-methylbutyl, 1,1-dimethylpropyl, pentyl, isopentyl, neopentyl, hexyl, and isohexyl.

The term "cycloalkyl," unless otherwise specified refers to a carbon based non-aromatic ring or ring system, but not limited to those of $C_3$ to $C_{15}$. It may contain from 1 to 4 rings, which are fused. Illustrative examples of cycloalkyl groups are for example cyclopropyl, cyclobutyl, cyclopentyl, cyclohexyl, cycloheptyl and cyclooctyl.

The term "heterocycloalkyl" refers to a $C_3$ to $C_{15}$ cycloalkyl group (nonaromatic) in which one of the carbon atoms in the ring is replaced by a heteroatom selected from O, S or N, and in which up to three additional carbon atoms may be replaced by heteroatoms.

The term "aryl," unless otherwise specified, refers to a $C_6$ to $C_{32}$ carbon based aromatic ring, including phenyl, naphthyl, phenanthryl, and anthracyl.

Any of the alkyl, cycloalkyl, aryl, alkenyl, or heterocycloalkyl groups may be substituted or unsubstituted. Unless otherwise specified, the each of these groups may be independently substituted with one or more moieties selected from the group consisting of alkyl, cycloalkyl, halo, haloalkyl, hydroxyl, carboxyl, acyl, acyloxy, amino, amido, alkylamino, dialkylamino, arylamino, alkoxy, aryloxy, nitro, cyano, thio, sulfonyl, sulfonic acid, ester, ether, carboxylic acid, phosphonyl, phosphinyl, thioether, oxime, aryl, heteroaryl, heterocycloalkyl, or any other viable functional group, either unprotected, or protected as necessary, as known to those skilled in the art, for example, as taught in Greene, et al., *Protective Groups in Organic Synthesis*, John Wiley and Sons, Second Edition, 1991.

Halogen and "halo", as used herein, includes bromine, chlorine, fluorine and iodine.

The term "entanglement density" as used herein refers to the number of chain entanglements in a given volume or amount of polymer and is proportional to the plateau modulus for the polymer at a given temperature. The concept of chain entanglement density may be understood by considering the definitions provided herein for chain entanglement, physical network and entanglement network. These definitions correspond to those provided by the International Union of Pure and Applied Chemistry (IUPAC), as given in the IUPAC reference document PAC, 2007, 79, 1801 (Definitions of terms relating to the structure and processing of sols, gels, networks, and inorganic-organic hybrid materials," (IUPAC Recommendations 2007) doi: 10.1351/pac200779101801.)

The term "chain entanglement" as used herein refers to the interlocking of polymer chains in a polymer material forming a transient or semi-permanent network junction over the time-scale of the measurement.

The term "physical network" as used herein refers to a polymer network with junction points or zones formed by physically interacting chains which need not be permanent: (1) the junction points or zones need not be permanent over the time scale of the observation or measurement, (2) the interaction can be due to hydrogen bonds, π-π interactions, chain entanglements, etc., and (3) modification of the entry given as a note within the definition of network in polymer chemistry.

The term "entanglement network" as used herein refers to a polymer network with junction points or zones formed by physically entangled chains.

The term "number average molecular weight" (Mn) as used herein is the ordinary arithmetic mean or average of the molecular masses of the individual macromolecules. It is determined by measuring the molecular mass of n polymer molecules, summing the masses, and dividing by n.

$$\overline{M}_n = \frac{\sum_i N_i M_i}{\sum_i N_i}$$

The number average molecular mass of a polymer can be determined by gel permeation chromatography, viscometry via the (Mark-Houwink equation), colligative methods such as vapor pressure osmometry, end-group determination or proton NMR.

The term "weight average molecular weight" (Mw) as used herein describes the molecular mass of a polymer. Polymer molecules, even if of the same type, come in different sizes (chain lengths, for linear polymers), so it is necessary to take an average of some kind.

For the mass average molecular mass, this is calculated by $$\overline{M}_w = \frac{\sum_i N_i M_i^2}{\sum_i N_i M_i}$$

where $N_i$ is the number of molecules of molecular mass $M_i$.

If the mass average molecular mass is m, and one chooses a random monomer, then the polymer it belongs to will have a mass of m on average (for a homopolymer). The mass average molecular mass can be determined by static light scattering, small angle neutron scattering, X-ray scattering, and sedimentation velocity. The ratio of the mass average to the number average is called the dispersity or the polydispersity index.

The term "entanglement molecular weight (Me) as used herein means as used herein refers to the molecular weight of a chain segment between two nearest junction points in an entanglement network or physical network as described above.

The term "zero shear viscosity" as used herein means the viscosity at the limit of low shear rate. In other words, the maximum plateau value attained as shear stress or shear rate is reduced. Zero-shear viscosity is effectively the viscosity of a product whilst at rest.

The term "creep" as used herein means the tendency of a solid material to move slowly or deform permanently under the influence of mechanical stresses. It can occur as a result of long-term exposure to high levels of stress that are still below the yield strength of the material. Plastic products are said to show a "creep behavior" where the product is deformed at room temperature as time elapses when an external force is applied continuously.

Creep resistance, corresponding, refers to a material's ability to resist any kind of distortion when under a load over an extended period of time.

Creep testing entails applying a small constant stress to a sample and monitoring its deformation over time. When a viscoelastic material is subjected to a creep test the initial stage of the test is dominated by elastic, recoverable deformation. As the test progresses the sample reaches an elastic equilibrium and only residual viscous non-recoverable flow persists. From the gradient of the strain/time plot in the later viscous-flow stage of the test zero-shear viscosity can be calculated. By extrapolating the straight-line regression from this part of the curve to an intercept on the strain axis it is possible to obtain the equilibrium elastic strain obtained from the sample—the maximum elastic recoverable strain under the specific imposed stress. Strain values can be divided by the applied stresses to obtain compliance, (symbol: J(t)), useful for where differing stresses are employed and the results are to be overlaid.

The term "relaxation" as used herein means a time constant describing the rate of relaxation of stresses in a material (e.g. a viscoelastic fluid) that has been deformed to a defined strain.

The term "melt strength" (MS) refers to the resistance of polymer melt to deformation is under the given set of conditions. The melt strength of a polymer indicates the resistance of a melt to extension, or sag. A variety of methods have been developed to measure melt strength as it applies to practical extrusion. The main one has been the Goettfert Rheotens device where a molten extrudate or fiber strand is pulled between two powered rollers as it leaves a downward-extruding orifice. As the speed of the rollers is increased, tension is created in the strand, which is measured by the Rheotens device. The loss modulus (G") and storage modulus (G') crossover as measured on an oscillatory rheometer has become useful for estimating melt strength.

The term "relaxation time" refers to the rate of relaxation of stresses in a material (e.g. a viscoelastic fluid) that has been deformed to a defined strain.

The term "viscosity" refers to the resistance to flow of a material. Viscosity may be reported in units of Pas (Pascal-second).

The term "chain architecture modifying agent" refers to a compound with functional groups capable of additional reactions with the terminal groups of a polyester resin, e.g., hydroxyl or carboxyl groups. These functional groups reacts with the terminal groups, resulting in chain extension or branching. In exemplary embodiments the branching agent is an electron-deficient alkyne molecules.

In exemplary embodiments, the at least one chain architecture modifying agent is an electron-deficient alkene, for example dimethyl maleate, maleic acid, acrylates, acrylic acid, and halogenated alkyl-susbituted alkenes.

In exemplary embodiments, the electron-deficient multialkene is, for example a multimaleamide, a multiacrylate, a bisnitroalkene, an amide-substituted alkene, an imide-substituted alkene, a haloalkyl-substituted alkene, or a combination thereof.

In exemplary embodiments, the electron-deficient multialkene is a multimaleamide or combination thereof.

In exemplary embodiments, the multimaleamide is a bismaleamide, trimaleamide, tetramaleamide, pentamaleamide, or hexamaleamide.

In exemplary embodiments, the bismaleamide is selected from the group consisting of:

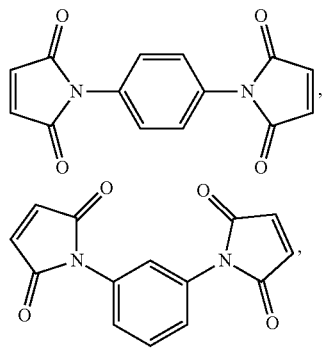

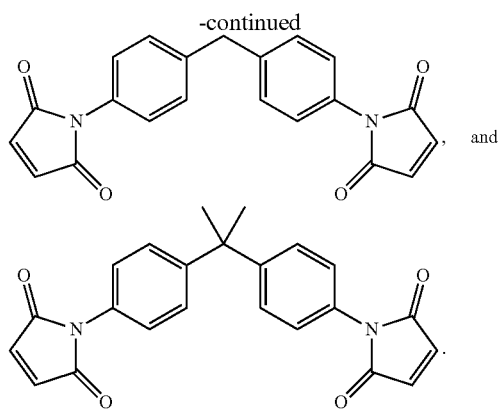

In exemplary embodiments, the bismaleamide is selected from the group consisting of:

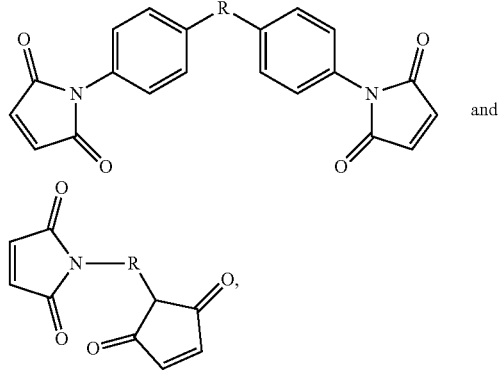

and wherein R is divalent and selected from the group consisting $C_{1-4}$ alkyl, $C_{1-4}$ haloalkyl, phenyl, O, S, NR', C(=O), S(=O), NR'C(=O), S(=O)$_2$, O—($C_{1-4}$ alkyl), S—($C_{1-4}$ alkyl), NR'($C_{1-4}$ alkyl), C(=O)—($C_{1-4}$ alkyl), S(=O)—($C_{1-4}$ alkyl), NR'C(=O)—($C_{1-4}$ alkyl), S(=O)$_2$—($C_{1-4}$ alkyl), O-phenyl, S-phenyl, NR'-phenyl, C(=O)-phenyl, S(=O)-phenyl, NR'C(=O)-phenyl, S(=O)$_2$-phenyl, N(=O), N($C_{1-4}$ alkyl), N-aryl, phosphorus, P($C_{1-4}$ alkyl), P-aryl; and wherein R' is H or $C_{1-6}$ alkyl.

In exemplary embodiments, the trimaleamide is selected from the group consisting of:

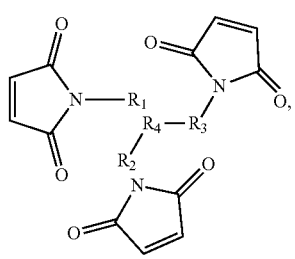

and wherein $R^1$, $R^2$, and $R^3$ are each divalent and selected from the group consisting of $C_{1-4}$ alkyl, $C_{1-4}$ haloalkyl, phenyl, O, S, NR', C(=O), S(=O), NR'C(=O), S(=O)$_2$, O—($C_{1-4}$ alkyl), S—($C_{1-4}$ alkyl), NR'($C_{1-4}$ alkyl), C(=O)—($C_{1-4}$ alkyl), S(=O)—($C_{1-4}$ alkyl), NR'C(=O)—($C_{1-4}$ alkyl), S(=O)$_2$—($C_{1-4}$ alkyl), O-phenyl, S-phenyl, NR'-phenyl, C(=O)-phenyl, S(=O)-phenyl, NR'C(=O)-phenyl, S(=O)$_2$-phenyl, N(=O), N(C$_{1-4}$ alkyl), N-aryl, phosphorus, P(C$_{1-4}$ alkyl), P-aryl; and wherein R' is H or C$_{1-6}$ alkyl; and R$^4$ is a C$_{1-4}$ alkyl or phenyl group substituted by R$^1$, R$^2$, and R$^3$.

In exemplary embodiments, the trimaleamide is selected from the group consisting of:

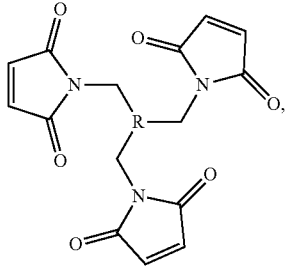

and wherein the R group is substituted by the three methylmaleamide groups and is selected from the group consisting of C$_{1-4}$ alkyl, C$_{1-4}$ haloalkyl, phenyl, O, S, NR', C(=O), S(=O), NR'C(=O), S(=O)$_2$, O—(C$_{1-4}$ alkyl), S—(C$_{1-4}$ alkyl), NR'(C$_{1-4}$ alkyl), C(=O)—(C$_{1-4}$ alkyl), S(=O)—(C$_{1-4}$ alkyl), NR'C(=O)—(C$_{1-4}$ alkyl), S(=O)$_2$—(C$_{1-4}$ alkyl), O-phenyl, S-phenyl, NR'-phenyl, C(=O)-phenyl, S(=O)-phenyl, NR'C(=O)-phenyl, S(=O)$_2$-phenyl, N(=O), N(C$_{1-4}$ alkyl), N-aryl, phosphorus, P(C$_{1-4}$ alkyl), P-aryl; and wherein R' is H or C$_{1-6}$ alkyl.

In exemplary embodiments, the tetramaleamide is selected from the group consisting of:

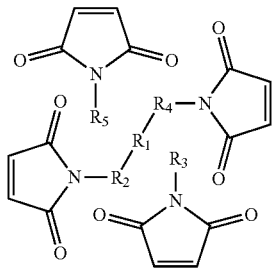

and wherein R$^1$ is substituted by R$^2$, R$^3$, R$^4$ and R$^5$; and R$^1$ is selected from the group consisting of C$_{1-4}$ alkyl, C$_{1-4}$ haloalkyl, phenyl, O, S, NR', C(=O), S(=O), NR'C(=O), S(=O)$_2$, O—(C$_{1-4}$ alkyl), S—(C$_{1-4}$ alkyl), NR'(C$_{1-4}$ alkyl), C(=O)—(C$_{1-4}$ alkyl), S(=O)—(C$_{1-4}$ alkyl), NR'C(=O)—(C$_{1-4}$ alkyl), S(=O)$_2$—(C$_{1-4}$ alkyl), O-phenyl, S-phenyl, NR'-phenyl, C(=O)-phenyl, S(=O)-phenyl, NR'C(=O)-phenyl, S(=O)$_2$-phenyl, N(=O), N(C$_{1-4}$ alkyl), N-aryl, phosphorus, P(C$_{1-4}$ alkyl), P-aryl; and wherein each R' is independently H or C$_{1-6}$ alkyl; and R$^2$, R$^3$, R$^4$ and R$^5$ are each independently selected from the group consisting of C$_{1-4}$ alkyl, C$_{1-4}$ haloalkyl, phenyl, O, S, NR', C(=O), S(=O), NR'C(=O), S(=O)$_2$, O—(C$_{1-4}$ alkyl), S—(C$_{1-4}$ alkyl), NR'(C$_{1-4}$ alkyl), C(=O)—(C$_{1-4}$ alkyl), S(=O)—(C$_{1-4}$ alkyl), NR'C(=O)—(C$_{1-4}$ alkyl), S(=O)$_2$—(C$_{1-4}$ alkyl), O-phenyl, S-phenyl, NR'-phenyl, C(=O)-phenyl, S(=O)-phenyl, NR'C(=O)-phenyl, S(=O)$_2$-phenyl, N(=O), N(C$_{1-4}$ alkyl), N-aryl, phosphorus, P(C$_{1-4}$ alkyl), P-aryl.

In exemplary embodiments, the multimaleamide is selected from the group consisting of:

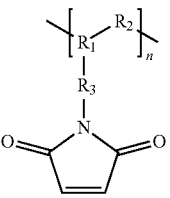

wherein R$^1$ and R$^2$ are each independently selected from the group consisting of C$_{1-4}$ alkyl, aryl, NR', NR'C(=O), NR'(C$_{1-4}$ alkyl), NR'C(=O)—(C$_{1-4}$ alkyl), NR'-phenyl, NR'C(=O)-phenyl, N(=O), N(C$_{1-4}$ alkyl), N-aryl; wherein each R' is independently H or C$_{1-6}$ alkyl; and R$^3$ is selected from the group consisting C$_{1-4}$ alkyl, C$_{1-4}$ haloalkyl, phenyl, O, S, C(=O), S(=O), S(=O)$_2$, O—(C$_{1-4}$ alkyl), S—(C$_{1-4}$ alkyl), C(=O)—(C$_{1-4}$ alkyl), S(=O)—(C$_{1-4}$ alkyl), S(=O)$_2$—(C$_{1-4}$ alkyl), O-phenyl, S-phenyl, C(=O)-phenyl, S(=O)-phenyl, and S(=O)$_2$-phenyl; and n is 1-500,000.

In exemplary embodiments, the electron-deficient multialkene is a multiacrylate or combination thereof. In exemplary embodiments, the multiacrylate is a diacrylate, triacrylate, tetraacrylate, pentaacrylate, or hexaacrylate. In exemplary embodiments, the diacrylate is selected from the group consisting of:

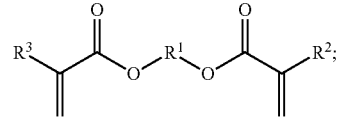

wherein R$^1$ is substituted by the two oxygen moieties and is selected from the group consisting of C$_{1-4}$ alkyl, C$_{1-4}$ haloalkyl, phenyl, O, S, NR', C(=O), S(=O), NR'C(=O), S(=O)$_2$, O—(C$_{1-4}$ alkyl), S—(C$_{1-4}$ alkyl), NR'(C$_{1-4}$ alkyl), C(=O)—(C$_{1-4}$ alkyl), S(=O)—(C$_{1-4}$ alkyl), NR'C(=O)—(C$_{1-4}$ alkyl), S(=O)$_2$—(C$_{1-4}$ alkyl), O-phenyl, S-phenyl, NR'-phenyl, C(=O)-phenyl, S(=O)-phenyl, NR'C(=O)-phenyl, S(=O)$_2$-phenyl, N(=O), N(C$_{1-4}$ alkyl), N-aryl, phosphorus, P(C$_{1-4}$ alkyl), and P-aryl; and wherein each R' is independently H or C$_{1-6}$ alkyl; and R$^2$ and R$^3$ are each independently selected from the group consisting of C$_{1-4}$ alkyl, C$_{1-4}$ haloalkyl, phenyl, O, S, NR', C(=O), S(=O), NR'C(=O), S(=O)$_2$, O—(C$_{1-4}$ alkyl), S—(C$_{1-4}$ alkyl), NR'(C$_{1-4}$ alkyl), C(=O)—(C$_{1-4}$ alkyl), S(=O)—(C$_{1-4}$ alkyl), NR'C(=O)—(C$_{1-4}$ alkyl), S(=O)$_2$—(C$_{1-4}$ alkyl), O-phenyl, S-phenyl, NR'-phenyl, C(=O)-phenyl, S(=O)-phenyl, NR'C(=O)-phenyl, S(=O)$_2$-phenyl, N(=O), N(C$_{1-4}$ alkyl), N-aryl, phosphorus, P(C$_{1-4}$ alkyl), and P-aryl.

In exemplary embodiments, the electron-deficient multialkene is a bisnitroalkene or combination thereof. In exemplary embodiments, the bisnitroalkene is selected from the group consisting of:

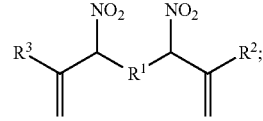

wherein R$^1$ is substituted by the two neighboring carbons and is selected from the group consisting of C$_{1-4}$ alkyl, C$_{1-4}$ haloalkyl, phenyl, O, S, NR', C(=O), S(=O), NR'C(=O), S(=O)₂, O—(C₁₋₄ alkyl), S—(C₁₋₄ alkyl), NR'(C₁₋₄ alkyl), C(=O)—(C₁₋₄ alkyl), S(=O)—(C₁₋₄ alkyl), NR'C(=O)—(C₁₋₄ alkyl), S(=O)₂—(C₁₋₄ alkyl), O-phenyl, S-phenyl, NR'-phenyl, C(=O)-phenyl, S(=O)-phenyl, NR'C(=O)-phenyl, S(=O)₂-phenyl, N(=O), N(C₁₋₄ alkyl), N-aryl, phosphorus, P(C₁₋₄ alkyl), and P-aryl; and wherein each R' is independently H or C₁₋₆ alkyl; and R² and R³ are each independently selected from the group consisting of C₁₋₄ alkyl, C₁₋₄ haloalkyl, phenyl, O, S, NR', C(=O), S(=O), NR'C(=O), S(=O)₂, O—(C₁₋₄ alkyl), S—(C₁₋₄ alkyl), NR' (C₁₋₄ alkyl), C(=O)—(C₁₋₄ alkyl), S(=O)—(C₁₋₄ alkyl), NR'C(=O)—(C₁₋₄ alkyl), S(=O)₂—(C₁₋₄ alkyl), O-phenyl, S-phenyl, NR'-phenyl, C(=O)-phenyl, S(=O)-phenyl, NR'C(=O)-phenyl, S(=O)₂-phenyl, N(=O), N(C₁₋₄ alkyl), N-aryl, phosphorus, P(C₁₋₄ alkyl), and P-aryl.

In exemplary embodiments, the electron-deficient alkene or electron-deficient multialkene is an amide-substituted alkene or combination thereof. In exemplary embodiments, the amide-substituted alkene is a dialkene-diamide compound, a trialkene-triamide compound, a tetraalkene-tetraamide compound, a pentaalkene-pentaamide compound, or a hexaalkene-hexaamide compound.

In exemplary embodiments, the amide-substituted alkene is selected from the group consisting of:

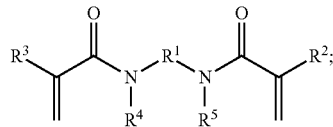

wherein R¹ is substituted by the two nitrogen moieties and is selected from the group consisting of C₁₋₄ alkyl, C₁₋₄ haloalkyl, phenyl, O, S, NR', C(=O), S(=O), NR'C(=O), S(=O)₂, O—(C₁₋₄ alkyl), S—(C₁₋₄ alkyl), NR'(C₁₋₄ alkyl), C(=O)—(C₁₋₄ alkyl), S(=O)—(C₁₋₄ alkyl), NR'C(=O)—(C₁₋₄ alkyl), S(=O)₂—(C₁₋₄ alkyl), O-phenyl, S-phenyl, NR'-phenyl, C(=O)-phenyl, S(=O)-phenyl, NR'C(=O)-phenyl, S(=O)₂-phenyl, N(=O), N(C₁₋₄ alkyl), N-aryl, phosphorus, P(C₁₋₄ alkyl), and P-aryl; and wherein each R' is independently H or C₁₋₆ alkyl; R² and R³ are each independently selected from the group consisting of C₁₋₄ alkyl, C₁₋₄ haloalkyl, phenyl, O, S, NR', C(=O), S(=O), NR'C(=O), S(=O)₂, O—(C₁₋₄ alkyl), S—(C₁₋₄ alkyl), NR' (C₁₋₄ alkyl), C(=O)—(C₁₋₄ alkyl), S(=O)—(C₁₋₄ alkyl), NR'C(=O)—(C₁₋₄ alkyl), S(=O)₂—(C₁₋₄ alkyl), O-phenyl, S-phenyl, NR'-phenyl, C(=O)-phenyl, S(=O)-phenyl, NR'C(=O)-phenyl, S(=O)₂-phenyl, N(=O), N(C₁₋₄ alkyl), N-aryl, phosphorus, P(C₁₋₄ alkyl), and P-aryl; and R⁴ and R⁵ are each independently selected from the group consisting of C₁₋₄ alkyl, C₁₋₄ haloalkyl, phenyl, O, S, NR', C(=O), S(=O), NR'C(=O), S(=O)₂, O—(C₁₋₄ alkyl), S—(C₁₋₄ alkyl), NR'(C₁₋₄ alkyl), C(=O)—(C₁₋₄ alkyl), S(=O)—(C₁₋₄ alkyl), NR'C(=O)—(C₁₋₄ alkyl), S(=O)₂—(C₁₋₄ alkyl), O-phenyl, S-phenyl, NR'-phenyl, C(=O)-phenyl, S(=O)-phenyl, NR'C(=O)-phenyl, S(=O)₂-phenyl, N(=O), N(C₁₋₄ alkyl), N-aryl, phosphorus, P—(C₁₋₄ alkyl), and P-aryl.

In exemplary embodiments, the electron-deficient multialkene is an imide-substituted alkene or combination thereof In exemplary embodiments, the multianhydride is selected from the group consisting of:

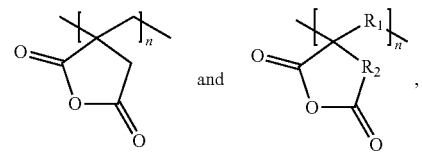

and wherein R¹ is selected from the group consisting C₁₋₄ alkyl, C₁₋₄ haloalkyl, phenyl, O, S, NR', C(=O), S(=O), NR'C(=O), S(=O)₂, O—(C₁₋₄ alkyl), S—(C₁₋₄ alkyl), NR' (C₁₋₄ alkyl), C(=O)—(C₁₋₄ alkyl), S(=O)—(C₁₋₄ alkyl), NR'C(=O)—(C₁₋₄ alkyl), S(=O)₂—(C₁₋₄ alkyl), O-phenyl, S-phenyl, NR'-phenyl, C(=O)-phenyl, S(=O)-phenyl, NR'C(=O)-phenyl, and S(=O)₂-phenyl; or wherein R¹ is a C₂-C₆ hydrocarbon containing 0-3 units of unsaturation that is bonded to the furan or dihydrofuran group through two carbons so as to form a ring; and wherein R' is H or C₁₋₆ alkyl; R² is divalent and is selected from the group consisting of C₁-C₃ alkyl, C(=O), NR', phenylene, S, and S(=O); and n is 1-500,000.

In exemplary embodiments, the at least one chain architecture modifying agent is a multioxazoline. In exemplary embodiments, the multioxazoline is a dioxazoline, trioxazoline, tetraoxazoline, pentaoxazoline or hexaoxazoline compound.

In exemplary embodiments, the multioxazoline is selected from the group consisting of:

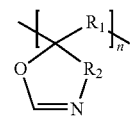

and wherein R¹ is selected from the group consisting of C₁₋₄ alkyl, C₁₋₄ haloalkyl, phenyl, O, S, NR', C(=O), S(=O), NR'C(=O), S(=O)₂, O—(C₁₋₄ alkyl), S—(C₁₋₄ alkyl), NR' (C₁₋₄ alkyl), C(=O)—(C₁₋₄ alkyl), S(=O)—(C₁₋₄ alkyl), NR'C(=O)—(C₁₋₄ alkyl), S(=O)₂—(C₁₋₄ alkyl), O-phenyl, S-phenyl, NR'-phenyl, C(=O)-phenyl, S(=O)-phenyl, NR'C(=O)-phenyl, and S(=O)₂-phenyl; or wherein R¹ is a C₂-C₆ hydrocarbon containing 0-3 units of unsaturation that is bonded to the furan or dihydrofuran group through two carbons so as to form a ring; and wherein R' is H or C₁₋₆ alkyl; R² is divalent and is selected from the group consisting of C₁-C₃ alkyl, C(=O), NR', phenylene, S, and S(=O); and n is 1-500,000.

In exemplary embodiments, the hexaoxazoline is selected from the group consisting of:

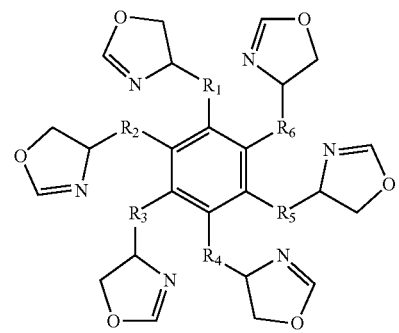

and wherein $R^1$, $R^2$, $R^3$, $R^4$, $R^5$, and $R^6$ are each selected from the group consisting $C_{1-4}$ alkyl, $C_{1-4}$ haloalkyl, phenyl, O, S, NR', C(=O), S(=O), NR'C(=O), S(=O)$_2$, O—($C_{1-4}$ alkyl), S—($C_{1-4}$ alkyl), NR'($C_{1-4}$ alkyl), C(=O)—($C_{1-4}$ alkyl), S(=O)—($C_{1-4}$ alkyl), NR'C(=O)—($C_{1-4}$ alkyl), S(=O)$_2$—($C_{1-4}$ alkyl), O-phenyl, S-phenyl, NR'-phenyl, C(=O)-phenyl, S(=O)-phenyl, NR'C(=O)-phenyl, and S(=O)$_2$-phenyl; or wherein each $R^1$, $R^2$, $R^3$, $R^4$, $R^5$, and $R^6$ is a $C_2$-$C_6$ hydrocarbon containing 0-3 units of unsaturation that is bonded to the furan or dihydrofuran group through two carbons so as to form a ring; and wherein R' is H or $C_{1-6}$ alkyl.

In exemplary embodiments, the chain architecture modifying agent is a multiepoxide. In exemplary embodiments, the multiepoxide is a diepoxide, triepoxide, tetraepoxide, pentaepoxide or hexaepoxide compound.

In exemplary embodiments, the diepoxide is selected from the group consisting of:

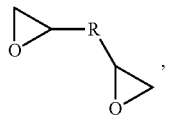

and wherein R is selected from the group consisting $C_{1-4}$ alkyl, $C_{1-4}$ haloalkyl, phenyl, O, S, C(=O), S(=O), S(=O)$_2$, O—($C_{1-4}$ alkyl), S—($C_{1-4}$ alkyl), C(=O)—($C_{1-4}$ alkyl), S(=O)—($C_{1-4}$ alkyl), S(=O)$_2$—($C_{1-4}$ alkyl), O-phenyl, S-phenyl, C(=O)-phenyl, S(=O)-phenyl, and S(=O)$_2$-phenyl; NH, N—($C_{1-4}$ alkyl), and N-aryl. In exemplary embodiments, N—($C_{1-4}$ alkyl) includes unsubstituted and substituted N—($C_{1-4}$ alkyl), for example, asymmetric-substituted N—($C_{1-4}$ alkyl); and N-aryl includes unsubstituted and substituted N-aryl, for example, asymmetric-substituted N-aryl.

In exemplary embodiments, the triepoxide is selected from the group consisting of:

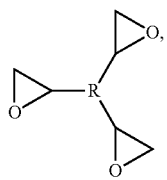

and wherein R is selected from the group consisting $C_{1-4}$ alkyl, $C_{1-4}$ haloalkyl, phenyl, O, S, C(=O), O—($C_{1-4}$ alkyl), S—($C_{1-4}$ alkyl), C(=O)—($C_{1-4}$ alkyl), S(=O)—($C_{1-4}$ alkyl), S(=O)$_2$—($C_{1-4}$ alkyl), O-phenyl, S-phenyl, C(=O)-phenyl, S(=O)-phenyl, S(=O)$_2$-phenyl, N—($C_1$-4 alkyl), N-aryl, trivalent phosphorus, trivalent phosphorus alkyl, and trivalent phosphorus aryl. In exemplary embodiments, N—($C_{1-4}$ alkyl) includes unsubstituted and substituted N—($C_{1-4}$ alkyl), for example, asymmetric-substituted N—($C_{1-4}$ alkyl); and N-aryl includes unsubstituted and substituted N-aryl, for example, asymmetric-substituted N-aryl.

In exemplary embodiments, the tetraepoxide is selected from the group consisting of:

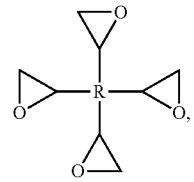

and wherein R is selected from the group consisting $C_{1-4}$ alkyl, $C_{1-4}$ haloalkyl, phenyl, O—($C_{1-4}$ alkyl), S—($C_{1-4}$ alkyl), C(=O)—($C_{1-4}$ alkyl), S(=O)—($C_{1-4}$ alkyl), S(=O)$_2$—($C_{1-4}$ alkyl), O-phenyl, S-phenyl, C(=O)-phenyl, S(=O)-phenyl, and S(=O)$_2$-phenyl.

In exemplary embodiments, the multiepoxide is selected from the group consisting of:

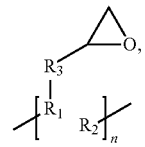

and wherein $R^1$ and $R^2$ are each independently selected from the group consisting of $CH_2$, $CH_2CH_2$, $C_3$-$C_6$ cycloalkyl, and aryl; and $R^3$ is selected from the group consisting $C_{1-4}$ alkyl, $C_{1-4}$ haloalkyl, phenyl, O, S, C(=O), S(=O), S(=O)$_2$, O—($C_{1-4}$ alkyl), S—($C_{1-4}$ alkyl), C(=O)—($C_{1-4}$ alkyl), S(=O)—($C_{1-4}$ alkyl), S(=O)$_2$—($C_{1-4}$ alkyl), O-phenyl, S-phenyl, C(=O)-phenyl, S(=O)-phenyl, and S(=O)$_2$-phenyl; and n is 1-500,000.

In exemplary embodiments, the chain architecture modifying agent is a multilactone.

In exemplary embodiments, the multilactone is a dilactone, trilactone, tetralactone, pentalactone or hexalactone compound.

In exemplary embodiments, the dilactone selected from the group consisting of:

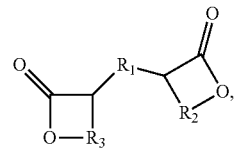

and wherein $R^1$ is selected from the group consisting $C_{1-4}$ alkyl, $C_{1-4}$ haloalkyl, phenyl, O, S, C(=O), S(=O), S(=O)$_2$, O—($C_{1-4}$ alkyl), S—($C_{1-4}$ alkyl), C(=O)—($C_{1-4}$ alkyl), S(=O)—($C_{1-4}$ alkyl), S(=O)$_2$—($C_{1-4}$ alkyl), O-phenyl, S-phenyl, C(=O)-phenyl, S(=O)-phenyl, and S(=O)$_2$-phenyl; N—($C_{1-4}$ alkyl), N-aryl, phosphorus, phosphorus alkyl, and phosphorus aryl; and wherein $R^2$ and $R^3$ are each divalent and independently selected from the group consisting of $C_1$-$C_3$ alkyl, C(=O), NR', phenylene, S, and S(=O). In exemplary embodiments, N—($C_{1-4}$ alkyl) includes unsubstituted and substituted N—($C_{1-4}$ alkyl), for example, asymmetric-substituted N—($C_{1-4}$ alkyl); and N-aryl includes unsubstituted and substituted N-aryl, for example, asymmetric-substituted N-aryl.

In exemplary embodiments, the multilactone is selected from the group consisting of:

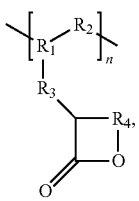

and wherein $R^1$ and $R^2$ are each independently selected from the group consisting of $CH_2$, $CH_2CH_2$, $C_3$-$C_6$ cycloalkyl, and aryl; $R^3$ is selected from the group consisting $C_{1-4}$ alkyl, $C_{1-4}$ haloalkyl, phenyl, O, S, C(=O), S(=O), S(=O)$_2$, O—($C_{1-4}$ alkyl), S—($C_{1-4}$ alkyl), C(=O)—($C_{1-4}$ alkyl), S(=O)—($C_{1-4}$ alkyl), S(=O)$_2$—($C_{1-4}$ alkyl), O-phenyl, S-phenyl, C(=O)-phenyl, S(=O)-phenyl, S(=O)$_2$-phenyl, N—($C_{1-4}$ alkyl), N-aryl, phosphorus, phosphorus alkyl, and phosphorus aryl; and $R^4$ is divalent and selected from the group consisting of $C_1$-$C_3$ alkyl, C(=O), NR', phenylene, S, and S(=O); n is 1-500,000.

In exemplary embodiments, the at least one chain architecture modifying agent comprises a cyclic reactive moieties: oxetanes, oxolanes, dioxolanes, oxepanes, dioxepanes and trioxepanes.

The weight percentage of the at least one chain architecture modifying agent may vary. In one embodiment, is in the range of about 0.0001% to about 20%, about The term "hot-fill" refers to a container where the contents of the container are at an elevated temperature when introduced into the container.

Copolymers

The copolymers of the present invention are polyesters or copolymers of poly(ethylenefuranoate) or PEF, a polymer manufactured from furan dicarboxylic acid (FDCA) and ethylene glycol.

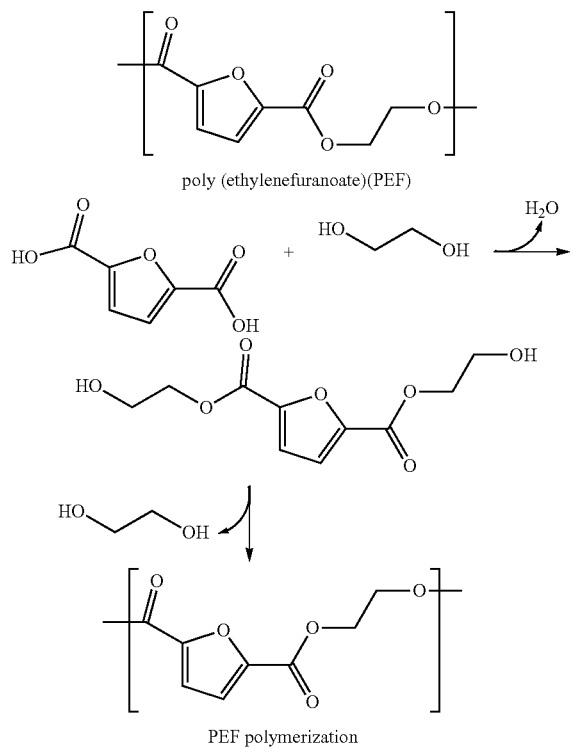

PEF polymerization

FDCA is produced from bio-based sugars, making PEF a renewable, sustainable bio-based polymer. PEF is structurally similar to polyethylene terephthalate (PET), but significantly different properties than PET—making it attractive for use in the manufacture of plastic articles, such as plastic packaging (e.g., bottles). PEF may also be produced via a similar process using the dimethyl ester of FDCA (FDME).

In exemplary embodiments, the present invention is a copolymer formed from the devolatization of polyester or more specifically poly(ethylenefuranoate) (PEF) in a falling strand, ribbon, or film devolatilization chamber under reduced pressure or an applied vacuum.

In another embodiment any furanoate polyester used herein can be processed by a FDCA synthesis route or a FDME (furanoate dimethyl ester) route.

Furanoate-based polyesters and copolyester represent a unique class of bio-based polymers capable of achieving high stiffness, excellent barrier properties and good thermal stability. For example, poly(ethylene-2,5-furanoate) (PEF) has been successfully injection molded into preforms from which stretch blow molded bottles have been produced that achieve parity with poly(ethylene terephthalate) in mechanical performance, while offering extensions into carbonated soft drink shelf life of six times or more. These polymers offer a distinct advantage over other bio-derived polymers such as the polylactide-based polymers in commercial applications such as food and beverage packaging.

However, the excellent gas barrier properties of the furanoate polyesters and copolyesters present processing challenges that can potentially impact commercialization economics. For example, solid-state polymerization (SSP) process times to lift PEF molecular weight (characterized by the intrinsic viscosity, or IV) and resin drying process times can exceed comparable SSP and drying times for PET by a factor of up to ten times or more, especially if resins with typical commercial pellet counts in the range of 60-90 pellets per gram are employed. Slower SSP and drying kinetics increase energy input and processing capacity requirements necessary to achieve equivalent economic performance for the two resin systems. The PCT Application WO2015137806 discloses IV lift rates for PEF SSP processing greater than about 0.0080 dL/g/hr using resin pellets in the size range of about 40-350 pellets per gram. Therefore, to achieve even a minimum acceptable IV increase rate, one must adopting a smaller average pellet size that would lower resin bulk density and potentially contribute to resin feeding instabilities in an extruder.

Consequently, an alternative process for raising PEF molecular weight (intrinsic viscosity) would provide a distinct productivity and production cost advantage compared to the conventional SSP process described in WO2015137806 remains a need for which no practical solution has been developed. This disclosure describes the use of a unique process concept for raising the molecular weight of low intrinsic viscosity furanoate-based polyesters and copolyester resin pellets at IV lift rates approaching 75 times that taught by WO2015137806. This process primarily heretofore has been used to raise the intrinsic viscosity of post-consumer recycled poly(ethylene terephthalate) resin flake and pellets.

Moreover, there are many possible combinations and permutations of falling strand devolatilization/rotary disc finisher with various other polymer processing equipment that may be employed in the commercial production of polymer parts and articles. Below is a list of typical combinations.

Definitions/Terminology

HCMG=Heating chamber/melting grid
MP=Melt pump
SSE=Single screw extruder
TSE=Twin screw extruder
FSD=Falling strand devolatilizer
RDF=Rotary disc finisher
IMM=Injection molding
ICMM=Injection compression molding machine
ISBM=Injection stretch blow molding machine
ICSBM=Injection compression stretch blow molding The following list, though not all-inclusive of possibilities, illustrates the broad applicability of the FSD/RDF process to the manufacture of plastic articles.

Examples of Possible Process Schemes

Process Scheme #1: HCMG/MP→FSD/DTF→Pelletizer
Process Scheme #2: SSE→FSD/DTF→Pelletizer
Process Scheme #3: TSE→FSD/DTF→Pelletizer
Process Scheme #4: HCMG/MP→FSD/DTF/FSD→Pelletizer
Process Scheme #5: SSE/MP→FSD/DTF/FSD→Pelletizer
Process Scheme #6: TSE/MP→FSD/DTF/FSD→Pelletizer
Process Scheme #7: HCMG/MP→FSD/DTF→MP→Fiber
Process Scheme #8: SSE/MP→FSD/DTF→MP→Fiber
Process Scheme #9: TSE/MP→FSD/DTF→MP→Fiber
Process Scheme #10: SSE/MP→FSD/DTF→MP→Bico-Fiber
Process Scheme #11: TSE/MP→FSD/DTF→MP→Bico-Fiber
Process Scheme #12: SSE/MP→FSD/DTF→SSE→Monolayer Film
Process Scheme #13: SSE/MP→FSD/DTF→TSE→Monolayer Film
Process Scheme #14: SSE/MP→FSD/DTF→SSE→Multilayer Film
Process Scheme #15: SSE/MP→FSD/DTF→TSE→Multilayer Film
Process Scheme #16: SSE/MP→FSD/DTF→SSE→Monolayer Film
Process Scheme #17: SSE/MP→FSD/DTF→TSE→Monolayer Film
Process Scheme #18: SSE/MP→FSD/DTF→IMM→Preform
Process Scheme #19: SSE/MP→FSD/DTF→IMM→Preform
Process Scheme #20: SSE/MP→FSD/DTF→ICMM→Preform
Process Scheme #21: SSE/MP→FSD/DTF→ICMM→Preform
Process Scheme #22: SSE/MP→FSD/DTF→ISBM→Container
Process Scheme #23: SSE/MP→FSD/DTF→ISBM→Container
Process Scheme #24: SSE/MP→FSD/DTF→ICSBM→Container
Process Scheme #25: SSE/MP→FSD/DTF→ICSBM→Container
Process Scheme #26: HCMG/MP→FSD/DTF/FSD→MP→Fiber
Process Scheme #27: SSE/MP→FSD/DTF/FSD→MP→Fiber
Process Scheme #28: TSE/MP→FSD/DTF/FSD→MP→Fiber
Process Scheme #29: SSE/MP→FSD/DTF/FSD→MP→Bico-Fiber
Process Scheme #30: TSE/MP→FSD/DTF/FSD→MP→Bico-Fiber
Process Scheme #31: SSE/MP→FSD/DTF/FSD→SSE→Monolayer Film
Process Scheme #32: SSE/MP→FSD/DTF/FSD→TSE→Monolayer Film
Process Scheme #34: SSE/MP→FSD/DTF/FSD→SSE→Multilayer Film
Process Scheme #35: SSE/MP→FSD/DTF/FSD→TSE→Multilayer Film
Process Scheme #36: SSE/MP→FSD/DTF/FSD→SSE→Monolayer Film
Process Scheme #37: SSE/MP→FSD/DTF/FSD→TSE→Monolayer Film
Process Scheme #38: SSE/MP→FSD/DTF/FSD→IMM→Preform
Process Scheme #39: SSE/MP→FSD/DTF/FSD→IMM→Preform
Process Scheme #40: SSE/MP→FSD/DTF/FSD→ICMM→Preform
Process Scheme #41: SSE/MP→FSD/DTF/FSD→ICMM→Preform
Process Scheme #42: SSE/MP→FSD/DTF/FSD→ISBM→Container
Process Scheme #43: SSE/MP→FSD/DTF/FSD→ISBM→Container
Process Scheme #44: SSE/MP→FSD/DTF/FSD→ICSBM→Container
Process Scheme #45: SSE/MP→FSD/DTF/FSD→ICSBM→Container Next Generation Recycling (NGR) markets and sales processing equipment to the post-consumer recycled poly (ethylene terephthalate) flake market for the devolatilization, recycling, and recovery of scrap PET. The NGR P:REACT™ LSP liquid state polycondensation process is modular, and employs a tandem arrangement of a falling strand devolatitilizer in series with a high vacuum finisher to raise the intrinsic viscosity of the melted PET ground flake. The reactor vessels and associated control systems of the NGR chip/pellet/flake polycondensation reactor system are illustrated in FIG. 1.

According to the NGR marketing brochure for the P:REACT™ flake continuous polycondensation system, the process is capable of raising the molten flake IV up to 0.85 dL/g at a rate of 0.01 dL/g/min operating in a vacuum range between 0.05 mbar and 5 mbar. The conversion of a 0.50 dL/g IV feed PEF resin to a 0.75 dL/g finished resin is anticipated to take about 20-30 min, based upon the corresponding PET polymerization kinetics. Control of molten resin IV is maintained by manipulating the vacuum level through a rheometry-based feedback control loop using the pressure drop over a capillary rheometer at the exit of the melt pump downstream of the vacuum finisher.

The benefits of the technology for reclaiming scrap PET are: (1) eliminate of SSP as a mandatory processing step, (2) speed productivity, and (3) facilitates the use of lower a lower IV scrap resin supply. In the case of the scope of the present invention described herein, the P:REACT™ system will be used to raise the intrinsic viscosity of unmodified and reactively modified polyesters and copolyesters using a processing scheme similar, but not limited to that presented in FIG. 2. In one embodiment, FIG. 2 comprises adding PEF/PXF pellets (0.65-0.75 dL/g) 210 to an extruder and melt pump 211 connected to the system 100 of FIG. 1., connected to the twin screw compounder 212 which can add reactive modification/inorganic fillers, connected to a pelletizer 214 to produce modified PEF/PXF pellets 216 of ≥0.85 dL/g. More specifically, in the case of the scope of the present invention described herein, the P:REACT™ system will be used to raise the intrinsic viscosity of unmodified and reactively modified furanoate-based polyesters and copolyesters using a processing scheme similar, but not limited to that presented in FIG. 2.

A typical falling strand devolitizer utilizes from about 1,000 to 7,000 capillaries though which 200 lbm/hr to 4,800 lbm/hr is extruded (based upon the equipment scale) under high vacuum. Filament free-fall distances as high as 30 feet occur isothermally at the melt temperature under vacuum yielding a high rate of surface area generation and volatiles (predominately glycol) flashing assisting polymerization.

Figure 2:
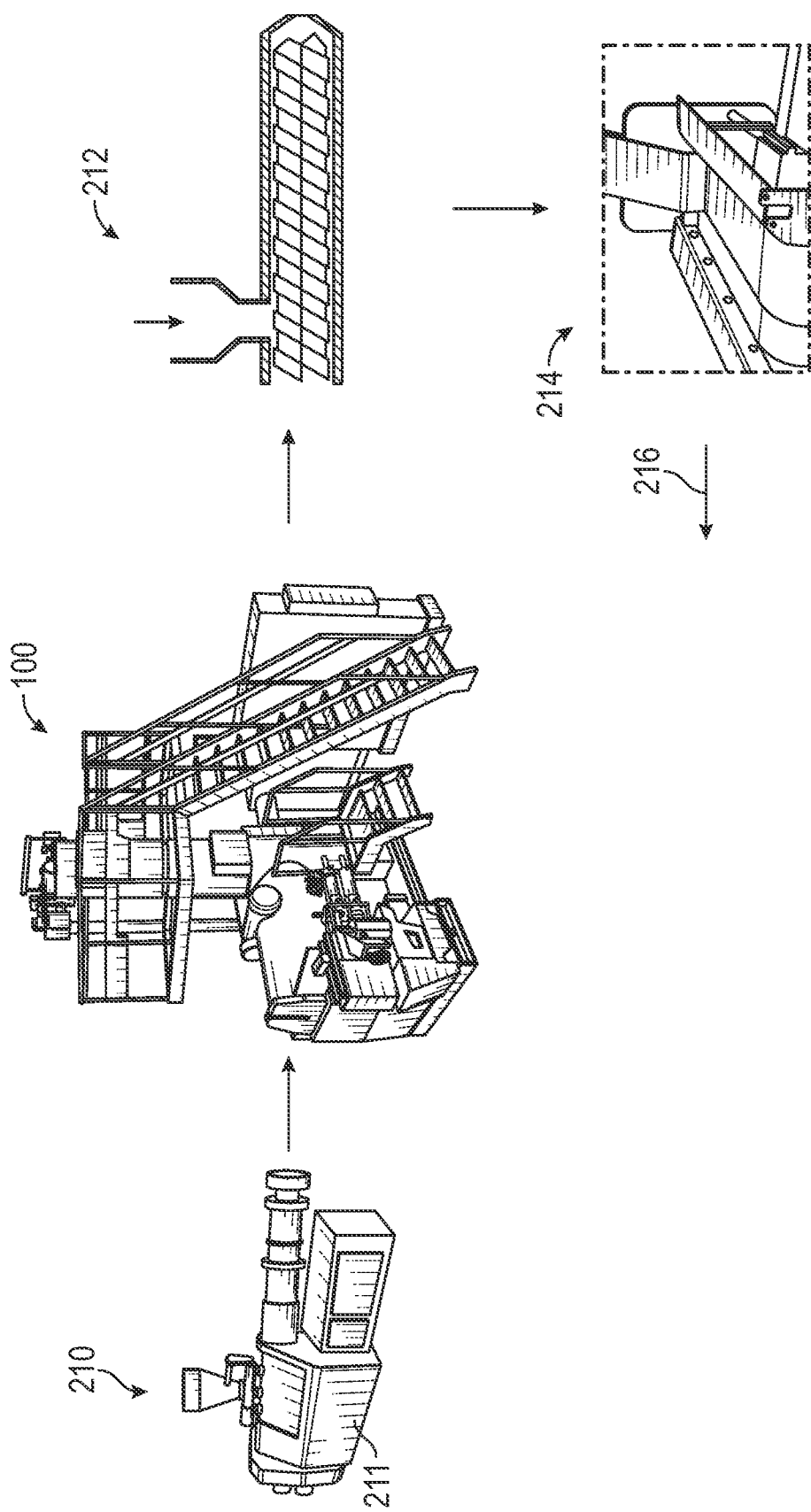
FIG. 2 is an example schematic depicting how the devolatilizer 100 of FIG. 1 could be used to enhance PEF properties and performance by increasing entanglement density through the reactive incorporation of long-chain branching, according to one implementation of the technologies described herein.

The modular nature of the P:REACT™ system allows it to be connected in various process configurations to achieve desired polymer composition, molecular weight, and physical property goals. FIG. 2 illustrates how the P:REACT™ system could be used to incorporate long-chain branching through reactive modification of a furanoate-based resin (e.g. PEF, PXF, etc.) prior to pelletization, where PXF refers to a furanoate-based polyester utilizing a glycol other than monoethylene glycol. Although the process feed polyester or copolyester resin may be dried to a moisture level at or below about 50 ppm, a key feature of the falling strand devolatilizer is that it does not require pre-drying of the resin for adequate IV lift to occur.

The NGR P:REACT™ system, in a process configuration similar to that shown in FIG. 2 provides a more economical pathway to reactive extrusion modification of furanoate-based polyesters and copolyester (with pre- or post-IV lift processing schemes, or both) relative to off-line compounding or in-line mixing of additives and injection molding directly since all composition modification can occur in one process with a greater assurance of homogeneity in the final polymer pellet. For example, the staging of various multifunctional (f>2) reactive branching agents could conceivably proceed (though not an exhaustive listing) as follows:

Pentaerythritol trimethanylolpropane, glycerol, 1,1,1-tris (hydroxymethyl)ethane and other multifunctional diols—pre-IV lift reaction in first extrusion compounder (with or without devolatilization of $H_2O$);

Pyromellitic dianhydride (PMDA), trimellitic acid and other multifunctional acids—either pre- or post-IV lift (first or second compounding and devolatilizing extruders);

Pentaerythritol (pre-IV lift) with PMDA (post-IV lift), pentaerythritol compounded in the first extruder, with PMDA compounded in the second extruder before pelletization; and/or BASF Joncryl® ADR-4368 (post-IV lift) to minimize increasing melt residence times and broadening the melt residence time distribution due to the resulting shear viscosity increase following reactive modification of the polymer.

Figure 3:
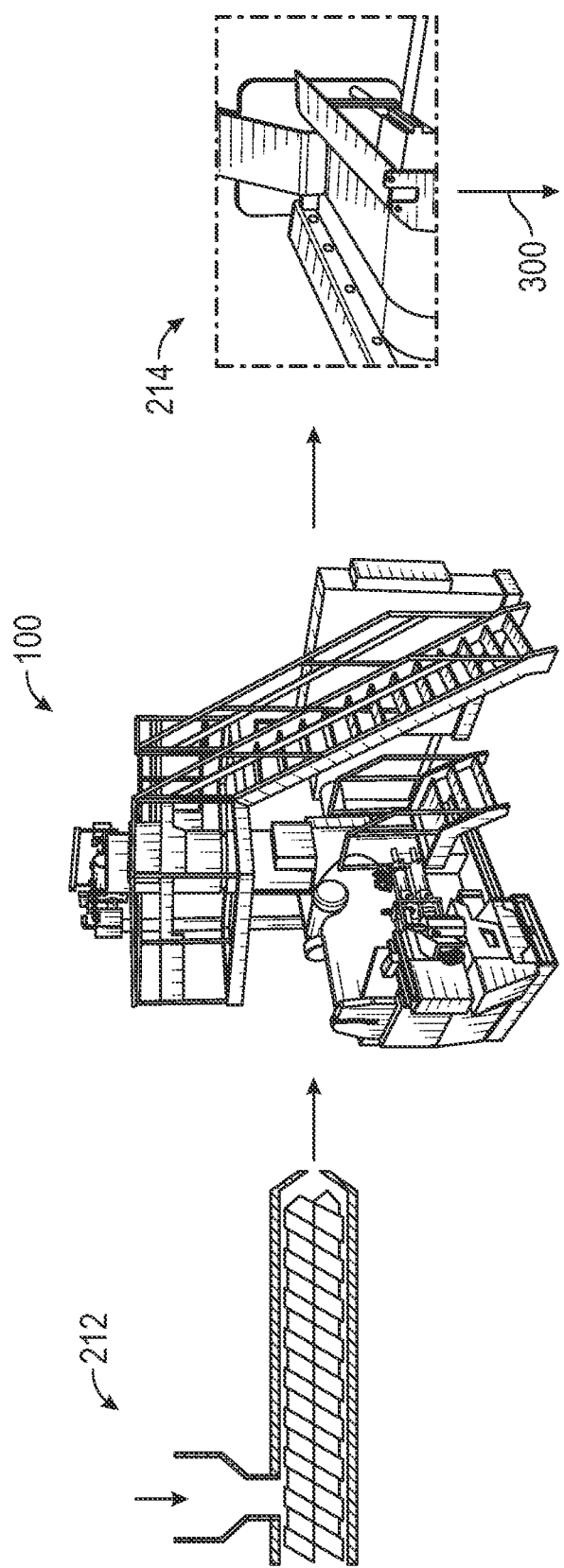
FIG. 3 is an example schematic depicting how the devolatitizer 100 of FIG. 1 could be used to enhance PEF properties and performance through the addition of inorganic and organic additives.
Figure 4:
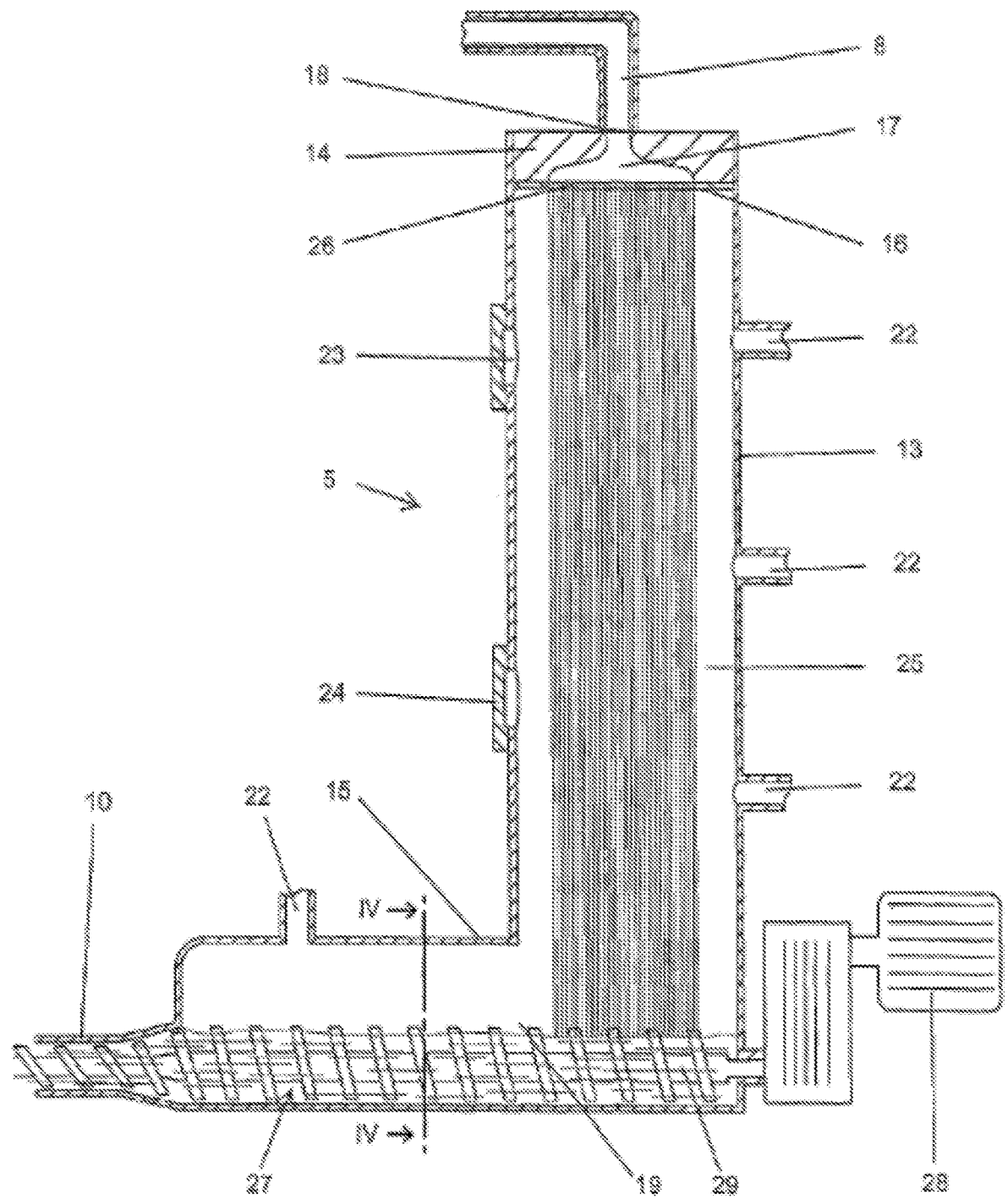
FIG. 4 is a more detailed schematic of the devolatilizer 100 of FIG. 1, according to one implementation of the technologies described herein.
Figure 5:
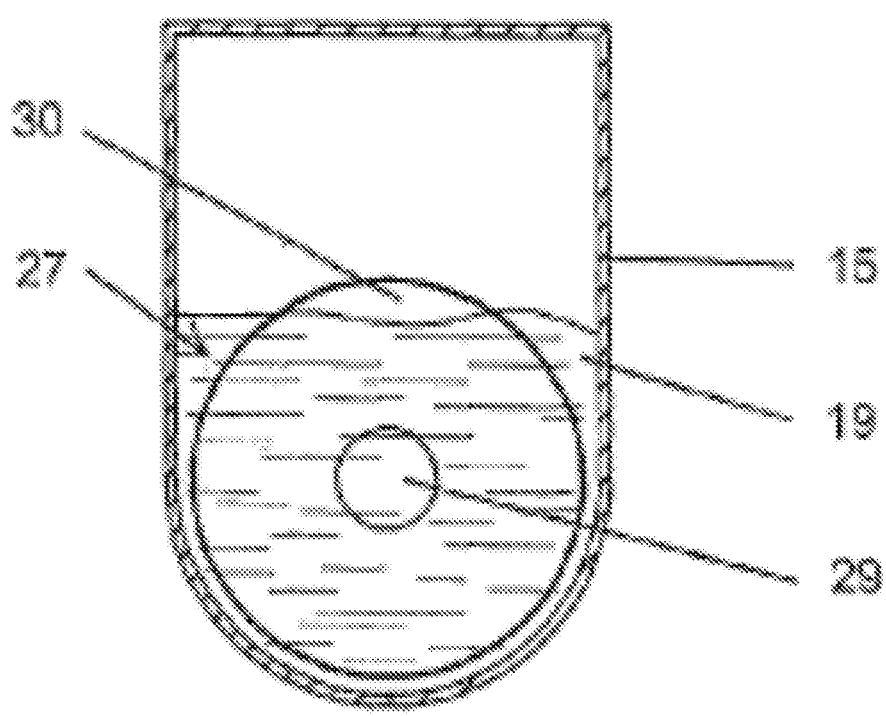
FIG. 5 is a cut-away section of the schematic of FIG. 4.

The equipment configuration in FIG. 2 can also be used for adding any kind of inorganic and organic additives at the twin screw compounder 212 stage such as nanoclays, nanocellulosic crystals, graphene, talc, mica, nucleating agents, reheat agents, UV blockers. The IV of the resin feeding into the single or twin screw extruder can be raised in the LSP unit to account for the drop in IV during compounding. In addition, the equipment can be configured as shown in FIG. 3, where we start with compounding with a twin screw compounder 212 a masterbatch or directly the additive with the polyester or copolyester (e.g. PET, PEF, or PXF) resin (starting IV can be from 0.50-0.95 dl/g, 0.65-0.80 dL/g in FIG. 3) at a certain concentration (e.g. 5 wt. % nanoclay) followed by IV lift in NGR P:REACT™ system, and then pelletizing the resulting resin with a pelletizer 214 to produce a compound composite PET/PEF/PXF resin with an IV of ≥0.8 dL/g 300.

The faster IV build rate realized with the system 100 of FIG. 1 exceeds that of a conventional SSP process by 25 percent or more. A preferred IV lift increment could be as high as 0.30 dL/g, assuming the polycondensation process is operable to a finished IV of about 0.90 dL/g. Such a high IV lift for SSP would require at least one or more days of processing to achieve the targeted resin IV. Assuming comparable energy and labor costs, processing cost would follow the respective processing times. Using such an assumption, process costs for PEF could be up to about 10 times less for the P:REACTDO system compared to the conventional SSP process for PEF.

Furthermore, tables 1 and 2 reveal the surprising and unexpected result that resin product color is improved in the falling strand devolatilizer/rotary disc finisher (FSD/RDF) polymerization process. For Indorama 7000A, the improvement in CieLab b* (a measure of resin yellowness) is either maintained or slightly improved by as many as 2.5 b* units. While the corresponding data for Indorama 3301 does not exhibit this effect, and not being bound to theory, it is believe that operating the FSD/RDF system with a feed resin of lower intrinsic viscosity, the build-up of yellowness in the resin as a result of degradation is significantly reduced as color-inducing reaction by-products are effectively stripped from the melt stream in the FSD.

TABLE 1

Processing of unmodified and reactively modified Indorama 7000A dried and undried resin on the NGR PREACT system. Reactor inlet melt temperature was 282-283° C. for the unmodified polyester and 284° C. for the long-chain branched modified polyester. Reactor configuration was 3,000 0.50 mm capillaries with a fall height of 2.50 m. Reactive modification was with 0.08 wt. % pyromellitic dianhydride (PMDA) pre-compounded into the resin.

| Feed Resin | Process Rate (kg/hr) | Feed IV (dL/g) | PMDA Addition (wt. %) | Feed Moisture Content (ppm) | Feed Resin Yellowness (b*) | Product Resin IV (dL/g) | IV Lift Rate (dL/g · min) | Product Resin Yellowness (CieLab b*) |
|---|---|---|---|---|---|---|---|---|
| Indorama 7000A | 250 | 0.529 | None | ≤50 | 1.18 | 0.689 | 0.0114 | 1.15 |
| | 250 | 0.529 | None | 1,148 | 1.18 | 0.680 | 0.00630 | 1.22 |
| | 220 | 0.520 | 0.08 | ≤50 | 6.01 | 0.747 | 0.00792 | 4.01 |
| | 180 | 0.520 | 0.08 | 1,237 | 6.01 | 0.801 | 0.00735 | 3.51 |

TABLE 2

Processing of unmodified and reactively modified Indorama 3301 dried and undried resin on the NGR PREACT system. Reactor inlet melt temperature was 291° C. for the unmodified polyester and 293° C. for the long-chain branched modified polyester. Reactor configuration was 3,000 0.50 mm capillaries with a fall height of 2.50 m. Reactive modification was with pyromellitic dianhydride (PMDA) pre-compounded into the resin.

| Feed Resin | Process Rate (kg/hr) | Feed IV (dL/g) | PMDA Addition (wt. %) | Feed Moisture Content (ppm) | Feed Resin Yellowness (b*) | Product Resin IV (dL/g) | IV Lift Rate (dL/g · min) | Product Resin Yellowness (CieLab b*) |
|---|---|---|---|---|---|---|---|---|
| Indorama 3301 | 200 | 0.730 | None | ≤50 | −0.94 | 0.919 | 0.00708 | 4.29 |
| | 200 | 0.730 | None | 2,199 | −0.94 | 0.911 | 0.00678 | 5.60 |
| | 220 | 0.644 | 0.08 | ≤50 | 3.94 | 0.836 | 0.00668 | — |
| | 220 | 0.644 | 0.08 | 1,932 | 3.94 | 0.874 | 0.00975 | — |

Those skilled in the art will readily appreciate that many modifications are possible in the exemplary embodiments disclosed herein without materially departing from the novel teachings and advantages according to this disclosure. Accordingly, all such modifications and equivalents are intended to be included within the scope of this disclosure as defined in the following claims. Therefore, it is to be understood that resort can be had to various other aspects, embodiments, modifications, and equivalents thereof which, after reading the description herein, may suggest themselves to one of ordinary skill in the art without departing from the spirit of the present disclosure or the scope of the appended claims.

Further embodiments of the present invention are as follows: these embodiments in no way limit the scope of the Invention.

A copolymer comprising a polyester or copolyester, being processed through a falling strand devolatilizer and finisher, thereby lifting the intrinsic viscosity (IV) of the copolymer.

A process for melt-state polymerization (MSP) of polyesters and co-polyesters by: a) compounding an inorganic and/or organic additives with a polyester or co-polyester to form a resin; b) extruding said resin into a falling strand devolatilizer/finisher thereby lifting the intrinsic viscosity (IV) of the resin; and c) pelletizing said resin.

A process MSP wherein polyesters and co-polyesters are compounded within the range of intrinsic viscosities between about 0.50 to about 0.95 dL/g.

A process for MSP, wherein the IV lift rate exceeds that of a convention SSP process by about 25% or more for polyesters and co-polyesters.

A process for melt-state polymerization of polyesters and co-polyesters by: a) plasticating, melting, and extruding polyester resin pellets into a falling strand devolatilizer/finisher to form a polyester melt; feeding said resin into a compounder; and pelletizing said resin.

A process for MSP, wherein the polyesters and copolyesters are compounded within the range of intrinsic viscosities between about 0.50 to about 0.95 dL/g.

A process for MSP, wherein the IV lift rate exceeds that of a convention SSP process by about 25% or more for polyesters and co-polyesters.

A process for melt-state polymerization of polyesters and co-polyesters by: a) compounding an inorganic and/or organic additives with polyester pellets to form a resin melt; b) extruding said resin melt into an evacuated chamber thereby lifting the intrinsic viscosity (IV) of the resin; and c) pelletizing said resin.

A process for MSP, wherein polyester or co-polyester pellets are compounded within the range of intrinsic viscosities between about 0.50 to about 0.95 dL/g.

A process for MSP, wherein the IV lift rate exceeds that of a convention SSP process by 25% or more for polyesters and co-polyesters.

A process for melt-state polymerization of polyesters and co-polyesters by: a) adding polyester pellets into an evacuated chamber to form a resin with lifted intrinsic viscosity (IV); feeding the IV of said resin into a twin screw compounder to compound in additional additives; and pelletizing said resin.

A process for MSP, wherein the polyester pellets are compounded within the range of intrinsic viscosities between about 0.50 to about 0.95 dL/g.

A process for MSP, wherein the IV lift rate exceeds that of a convention SSP process by 25% or more for polyesters and co-polyesters.

A process for melt-state polymerization of polyesters and co-polyesters by: a) melting polyester pellets to form a resin; b) flowing said resin vertically downward in the form of thin films, filaments or ribbons to increase surface area thereby devolatilizing the resin, c) lifting the intrinsic viscosity (IV) of the resin in a rotary disk-type finisher; and d) pelletizing the devolatilized resin.

A process for melt-state polymerization of polyesters and co-polyesters by: a) melting polyester pellets to form a resin melt; b) flowing said polyester melt vertically downward in one or more strands of flowing polyester to increase surface area thereby devolatilizing the resin, c) lifting the intrinsic viscosity of the melt in a rotary disk-type finisher, d) flowing said polyester melt vertically downward in one or more strands of flowing polyester in a second vacuum reactor to increase surface area thereby devolatilizing the resin; and c) pelletizing the devolatilized resin.

A process for melt-state polymerization utilizing any combination of one or more falling strand devolatilizer(s) and a rotary disk finisher in which the resin yellowness, as measured by Cielab b* yields a reduction in b* from the feed resin b* value.

A process for melt-state polymerization wherein the process can operate in a vacuum range between 1 torr and 5 torr.

Applicants reserve the right to proviso out any selection, feature, range, element, or aspect, for example, to limit the scope of any claim to account for a prior disclosure.

What is claimed is:

1. A process for melt-state polymerization of polyesters or co-polyesters, comprising:
    a) melting polyester or co-polyester pellets, wherein the polyester or co-polyester pellets comprise a furanoate-based polyester or copolyester, to form a feed resin;
    b) flowing the feed resin vertically downward in the form of strands, thin films, filaments, or ribbons to increase the surface area and provide a devolatilized resin; and
    c) pelletizing the devolatilized resin.

2. A process according to claim 1, wherein step b) of flowing the feed resin vertically downward in the form of thin films, filaments, or ribbons occurs by extruding the feed resin into an evacuated chamber.

3. A process according to claim 1, wherein step b) of flowing the feed resin vertically downward in the form of thin films, filaments, or ribbons occurs by extruding the feed resin into a falling strand devolatilizer/finisher.

4. A process according to claim 3, further comprising the step of increasing the intrinsic viscosity (IV) of the devolatilized resin in a rotary disk-type finisher after extruding the feed resin into a falling strand devolatilizer/finisher.

5. A process according to claim 1, wherein step a) of melting polyester or co-polyester pellets to form a feed resin further comprises compounding an inorganic additive and/or an organic additive with the polyester or co-polyester pellets to form the feed resin.

6. A process according to claim 1, wherein the intrinsic viscosity (IV) of the devolatilized resin is greater than the intrinsic viscosity (IV) of the feed resin.

7. A process according to claim 1, further comprising the step of extruding the devolatilized resin into a second falling strand devolatilizer/finisher after step b), wherein the polyester or co-polyester pellets comprise poly(ethylene-2,5-furandicarboxylate) (PEF); poly(trimethylene-2,5-furandicarboxylate) (PTF); or poly(butylene-2,5-furandicarboxylate) (PBF).

8. A process according to claim 1, further comprising the step(s) of:
  i) processing the devolatilized resin in a rotary disk-type finisher after step b); or
  ii) extruding the devolatilized resin into a second falling strand devolatilizer/finisher after step b); or
  iii) both steps i) and ii) in any sequence.

9. The process according to claim 1, wherein step c) of pelletizing the devolatilized resin further comprises compounding the devolatilized resin with at least one inorganic additive and/or at least one organic additive.

10. A process according to claim 1, wherein the devolatilized polyester or co-polyester resin is compounded to an intrinsic viscosity of from about 0.50 dL/g to about 0.95 dL/g.

11. A process according to claim 1, wherein the intrinsic viscosity of the devolatilized polyester or co-polyester resin exceeds the intrinsic viscosity of a devolatilized polyester or co-polyester resin processed by a conventional SSP process by at least 25%, under otherwise similar conditions.

12. A process according to claim 1, wherein the devolatilized resin yellowness b*, as measured by Cielab b*, is lower than the feed resin yellowness b*.

13. A process according to claim 1, wherein the polyester or co-polyester pellets comprise poly(ethylene-2,5-furandicarboxylate) (PEF); poly(trimethylene-2,5-furandicarboxylate) (PTF); poly(butylene-2,5-furandicarboxylate) (PBF); poly(isosorbide-2,5-furandicarboxylate) (PISF); poly(isoidide-2,5-furandicarboxylate) (PIIF); poly(isomannide-2,5-furandicarboxylate) (PIMF); poly(neopentyl-2,5-furandicarboxylate) (PNPGF); poly(ethylene-2,5-furandicarboxylate) with 10 mol. % 1,8-naphthalene dicarboxylate (PEF-PEN), poly(1,4-phenylene-2,5-furandicarboxylate) (PCHF); poly(1,2-dimethylphenylene-2,5-furandicarboxylate) (PDMFF); or any combinations thereof.

14. A process according to claim 1, wherein the polyester or co-polyester further comprises an electron-deficient alkene selected from dimethyl maleate, maleic acid, an acrylate, acrylic acid, or a halogenated alkyl-substituted alkene.

15. A process according to claim 1, wherein the polyester or co-polyester further comprises at least one chain architecture modifying agent selected from a multimaleamide, a multiacrylate, a bisnitroalkene, an amide-substituted alkene, an imide-substituted alkene, a haloalkyl-substituted alkene, a multioxazoline, a multiepoxide, a multilactone, an exocyclic reactive compound, or a combination thereof.

16. A process according to claim 1, wherein the polyester or co-polyester further comprises a chain architecture modifying agent in a concentration of from about 0.0001% to about 20%.

17. A process for melt-state polymerization of polyesters and co-polyesters, comprising:
  a) melting a furanoate-based polyester or co-polyester pellets to form a resin melt;
  b) flowing the resin melt vertically downward in one or more strands, thin films, filaments, or ribbons in a first vacuum reactor to increase surface area and provide a devolatilized resin melt;
  c) increasing the intrinsic viscosity of the devolatilized resin melt in a rotary disk-type finisher;
  d) flowing the devolatilized resin melt from step c) vertically downward in one or more strands, thin films, filaments, or ribbons in a second vacuum reactor to increase surface area and provide a further devolatilized resin; and
  e) pelletizing the further devolatilized resin.

18. A process according to claim 17, wherein the polyester or co-polyester pellets comprise poly(ethylene-2,5-furandicarboxylate) (PEF); poly(trimethylene-2,5-furandicarboxylate) (PTF); poly(butylene-2,5-furandicarboxylate) (PBF); poly(isosorbide-2,5-furandicarboxylate) (PIS F); poly(isoidide-2,5-furandicarboxylate) (PIIF); poly(isomannide-2,5-furandicarboxylate) (PIMF); poly(neopentyl-2,5-furandicarboxylate) (PNPGF); poly(ethylene-2,5-furandicarboxylate) with 10 mol. % 1,8-naphthalene dicarboxylate (PEF-PEN), poly(1,4-phenylene-2,5-furandicarboxylate) (PCHF); poly(1,2-dimethylphenylene-2,5-furandicarboxylate) (PDMFF); or any combinations thereof.

19. A process for melt-state polymerization of polyesters and co-polyesters, comprising:
  a) melting a furanoate-based polyester or co-polyester pellets to form a resin melt;
  b) flowing the resin melt vertically downward in one or more strands, thin films, filaments, or ribbons by extruding the feed resin into a falling strand devolatilizer/finisher to provide a devolatilized resin melt;
  c) optionally, increasing the intrinsic viscosity of the devolatilized resin melt in a rotary disk-type finisher; and
  d) compounding the devolatilized resin with at least one inorganic additive and/or at least one organic additive and pelletizing the devolatilized resin;
  wherein the furanoate-based polyester or co-polyester further comprises at least one chain architecture modifying agent.

* * * * *